US006444936B1

(12) United States Patent
Ludwig et al.

(10) Patent No.: US 6,444,936 B1
(45) Date of Patent: *Sep. 3, 2002

(54) DEVICE FOR SORTING PRODUCTS DEPENDING ON MEASURED PARAMETER, AND METHOD FOR OPERATING SAME

(75) Inventors: Jörg Ludwig, Limbach-Oberfrohna; Andreas Osterer, Hohndorf; Joachim Poller; Jens Schneider, both of Limbach-Oberfrohna, all of (DE)

(73) Assignee: Select Ingenieurgesellschaft Fuer Optoelektronik Bilderkennung und Qualitaetspruefung mbH, Hartmannsdorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/485,374

(22) PCT Filed: Aug. 11, 1998

(86) PCT No.: PCT/EP98/05088

§ 371 (c)(1),
(2), (4) Date: Feb. 8, 2000

(87) PCT Pub. No.: WO99/10113

PCT Pub. Date: Mar. 4, 1999

(30) Foreign Application Priority Data

Aug. 22, 1997 (DE) ........................................ 197 36 567

(51) Int. Cl.[7] .......................... B07C 5/10; B07C 5/342; B65G 47/88

(52) U.S. Cl. ....................... 209/586; 209/580; 209/587; 209/616; 209/655; 198/370.1; 198/598

(58) Field of Search ................................ 209/576, 577, 209/580, 586, 587, 616, 652, 655, 657, 638; 198/370.01, 370.07, 370.1, 598

(56) References Cited

U.S. PATENT DOCUMENTS 3,283,896 A * 11/1966 Jirik .......................... 209/576
3,664,483 A * 5/1972 Revaz ......................... 198/32
3,730,325 A * 5/1973 Goodwin ................. 198/33 R
4,331,241 A * 5/1982 Smirin et al. ............... 209/576
4,356,908 A 11/1982 Embro, Jr.
4,462,495 A * 7/1984 McKinley et al. .......... 209/576
4,946,045 A * 8/1990 Ditchburn et al. .......... 209/576
5,085,325 A 2/1992 Jones et al.
5,279,426 A * 1/1994 Crismon et al. ............ 209/657
5,305,893 A * 4/1994 Hereford .................... 209/577
5,469,974 A * 11/1995 Hagan ........................ 209/652
5,509,537 A * 4/1996 Crismon et al. ............ 209/577

FOREIGN PATENT DOCUMENTS

| | | |
|---|---|---|
| DE | 19509631 | 9/1996 |
| EP | 0384885 | 8/1990 |
| FR | 2620054 | 3/1989 |
| WO | WO 91/04803 | 4/1991 |
| WO | WO 92/18259 | 10/1992 |

* cited by examiner

*Primary Examiner*—Donald P. Walsh
*Assistant Examiner*—Daniel K Schlak
(74) *Attorney, Agent, or Firm*—Jordan and Hamburg LLP

(57) ABSTRACT

The invention relates to a device for sorting any desired pieces of products in dependence on criteria, and a method for operating the same. It is the object of the invention to provide a solution which permits a very fast at least three-channel fractionating of a product flow with a simultaneous mild treatment of products, at low expenditures for energy, and at a high wear resistance. The object is realized in that the products pass a first approaching zone, arrive in a second zone in which a separating element set into rotations by operation of a stepper-motor, including on its circumference with equidistantly spaced fingers, and which, in dependence on a respective control, transfers the products to be sorted into at least three further zones. A real-time image tracking system is provided which is adapted to capture the entire path of the products through the zones. The real-time image tracking system inputs individual product information of each single product such as at least one parameter as volume, speed, profile of parts, center of mass, defective spots, deflection characteristic, angular momentum, or the like into microprocessors and address arrays, respectively, and feeds said information into a main coordinate processor. The individual product information is adapted to be associated and addressable to each individual product. The output signals from said main coordinate processor control the stepper-motor and, thus, the separating element with single product related different senses of rotation and accelerations.

12 Claims, 2 Drawing Sheets

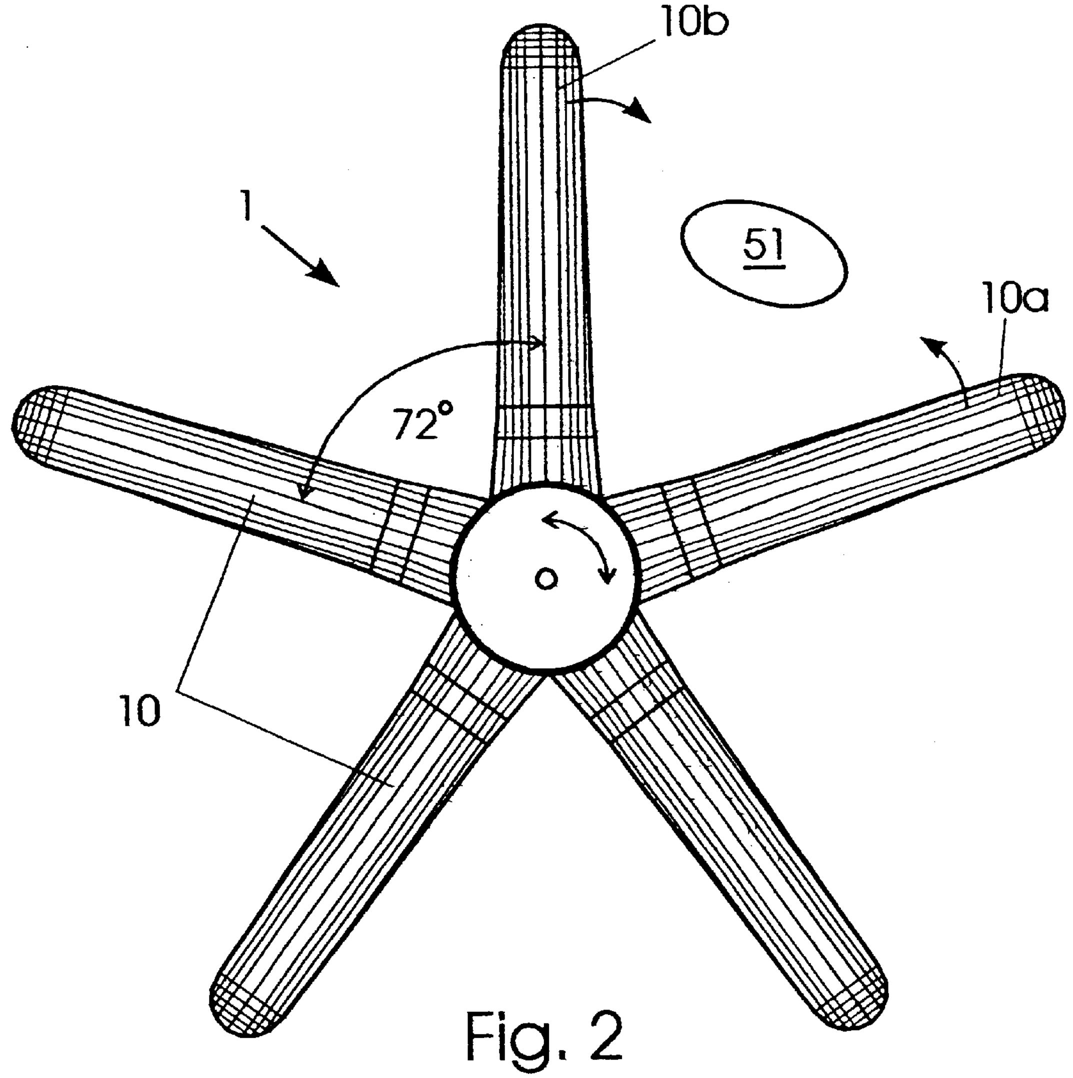
Fig. 2
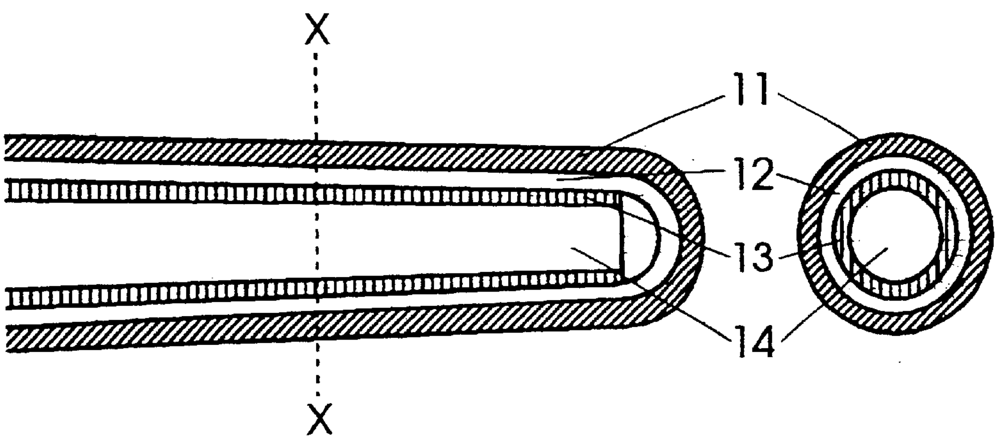
Fig. 3a
Fig. 3b

DEVICE FOR SORTING PRODUCTS DEPENDING ON MEASURED PARAMETER, AND METHOD FOR OPERATING SAME

BACKGROUND OF THE INVENTION

The present invention relates to a device for sorting products in dependence on a measured parameter, criteria, in particular for sorting small pieces of agricultural products, and products of the food industry or other pieces flowing in sequential masses, and also to a method for operating the device.

In U.S. Pat. 5,388,705 there is described a device for sorting bottles made of plastic, which are classified by a detection station as being contaminated or defective in some other way. The sorting is performed by means of a compressed air-operated ejection mechanism (ram). This solution is based on the condition that the plastic bottles are of a same standard size and are strictly laterally oriented between the detecting station and the ejection mechanism. With this solution four reflected light barriers are employed which are directed level to the serially arriving bottle necks on a conveyer belt, the light barriers are only operating as position indicators and only deliver YES/NO signals. This teaching is not capable of realizing the objects of the present invention.

In DE 195 32 306 A1 there is also described a sorting device for bottles in which a stepper motor drives a cam-disk shaped sorting means which applies a pulse-like impact to the bottles to be sorted. A condition for the operability of the device is the strict alignment of the bottle flow to be sorted, with all the bottles in a same position with respect to a constant narrow space to the sorting device. This solution does not permit a product preserving sorting according to different criteria of a differently composed flow of products as to size and quality.

Known devices that are nearest to the invention are sorting devices from the field of agriculture and food industry. A device is known from DE 27 23 674 A1 in which an ejector plate is provided in a downflow of harvested goods to be sorted, controlled by a preceding detection means and thus being adapted to perform a sorting into two fractions. A similar sorting into two fraction flows is described in DE 27 09 905 A1 which, in particular, separates rocks from harvest goods and in which a finger assembly adjustable in two positions releases, for example, a passageway for a perpendicular falling through of the rocks.

A further improvement is disclosed in an optoelectronic automatic sorting machine as described, for example, in DE 41 27 903. The principle of these selectors is that the products to be sorted are individually and subsequently optoelectronically scanned in a drop chamber by means of image converters which are, for example, in a mutually displaced arrangement of 120°. Thereby defective products are detected and by means of a suitable calculating program a product detected as defective is separated from the flow of accepted products by an air blast. Such automated sorting mechanisms operate, for example, with potatoes, at a throughput rate of up to 5000 kg/h. As concerns a quality sorting or a sorting out with respect to size of small-sized or sensitive products such as tomatoes, beans, peas, stone fruit, pomaceous fruit, berries, carrots, small carrots, slump-rooted carrots, onions, corn, legume, almonds, nuts, corns of spices, etc. or even, for example, 'pommes frites', these automated machines, however, are not suited with respect to throughput required or sensitivity of the products.

According to the prior art, the quality sorting out of small-sized products such as, for example, potato chips, pommes frites, lentils or similar small-sized products is carried out in that the products are, if possible, fed upon a conveyer belt at a spaced apart relation, where they are detected by an optoelectronic image converter and, at the end of the conveyer, defective products are separated from the accepted products flow by operation of respectively controlled selection mechanisms.

There are numerous disadvantages involved in such a kind of operation. It is feasible that products superimpose on the conveyer belt so that defective products cannot be detected at all. Products which have been detected as being defective can be subjected to position variations on their way from detection to the output end due to uneven running conveyor belts so that they are moved into another path and, accordingly, are not sorted out. Portions of the products which are turned off-side to the image converter, that is, those surfaces which rest upon the conveyer belt cannot be detected at all. These disadvantages can be obviated by a solution according to DE 196 46 753.5 which also performs only a selection into two fractions, that is, in a go/not go product flow by operation of a compressed air nozzle assembly which is the presently well-known and mildest selection means. Apart from the high expenditures required for the control of the compressed air nozzle assembly, the pulse sequence attainable thereby limits the total throughput that can be obtained for the products to be sorted. Moreover, the energy expenditure required with this ejection solution is very considerable and the acoustic emission can reach up to 90 dB.

SUMMARY OF THE INVENTION

It is an object of the present invention to provide a device for sorting any pieces of products in dependence on criteria and also a method for operating the same, which permits a very fast and at least three channel fractionating of a product flow and a simultaneous mild treatment of the products, at a low energy consumption, at a low acoustic emission, and a high wear-resistance, and which, at a change of the products to be sorted from, for example, carrots to onions, screws, plastic parts, is capable of a substantially automatic adaptation to a desired result of the sorting.

When within the scope of the invention there is reference to a sorting in dependence on criteria, then product parameters are to be understood thereby parameters such as volume, speed, profile of parts, center of mass, defective spots, deflection characteristic, angular momentum, or the like.

The very essence of the invention is that products of a sequential product flow pass a first approaching zone, arrive in a second zone, in which a separating element is provided and is rotatable by operation of a stepper motor wherein circumferentially and equally spaced apart fingers are mounted on the separating element and wherein the separating element, depending on a respective control, separates the products into at least three further partial fraction flow zones, accompanied by a real-time image tracking system capable of detecting the entire passage of the products through the three zones. The system feeds individual product information such as volume, speed, profile of parts, center of mass, defective spots, deflection characteristic, angular momentum, or the like into a memory, which information are adapted to be associated and addressable to each individual product. Addresses and address arrays, respectively, of the memory are fixedly related to geometrical coordinates of the zones passed by the products and to the geometric coordinates of the starting position and a congruent position of the separating element, respectively, at a resolution in an order of size of 1 mm/address. An access speed of the memory is at least high enough that, between each image stored by the image tracking system, a plurality of processors are adapted to have to different addresses, and a time-parallel or serial time-multiplex read access to individual product information. The processors by way of suitable programs are adapted to produce control signals which provide the stepper motor, which drives the separating element, with the required displacement-time function. Each respective product thus can be sorted at the right point of time and with the required sense of rotation and acceleration. The stepper motor is provided with a selsyn having a resolution in an order of size of 0.5 degrees, the coordinate signals of which provide the instantaneous values of the controlling stepper motor as to angular position, sense of rotation, speed, and acceleration to the controlling processors.

The operation of the device substantially takes place in the following manner: each piece of product of a sequential product flow, starting from the entry of the same in the first zone, an approaching zone, then a second zone, detectable by a separating element, to a third zone, a partial fraction flow zone, is detected by a real-time image tracking system. Each product from entry into the approaching zone is, in dependence on criteria, detected and continuously stored in the memory. The signals of the memory produced by aid of processors and suitable programs are fed into the stepper motor in such a manner that, when a product to be selected enters the second zone, said stepper motor drives the separating element in a way that a finger of the separating element is accelerated towards the product, it is decelerated for a short time at the moment of contacting the product, and thus applies a specific acceleration to the product. The product is brought into such an end position that, after the product piece selection has been completed, the fingers of the separating element move into a position which, independent of the sense of rotation they have been subjected to, is congruent to their starting position.

BRIEF DESCRIPTION OF THE DRAWINGS

In the following the invention will be explained in more detail by virtue of schematical embodiments. There is shown in:

FIG. 2 an embodiment of a separating element;

FIG. 3*a* a longitudinal section of a finger of the separating element of FIG. 2; and FIG. 3*b* a section of a finger of FIG. 3*a* along a plane X—X.

DETAILED DESCRIPTION OF THE INVENTION

Figure 1:
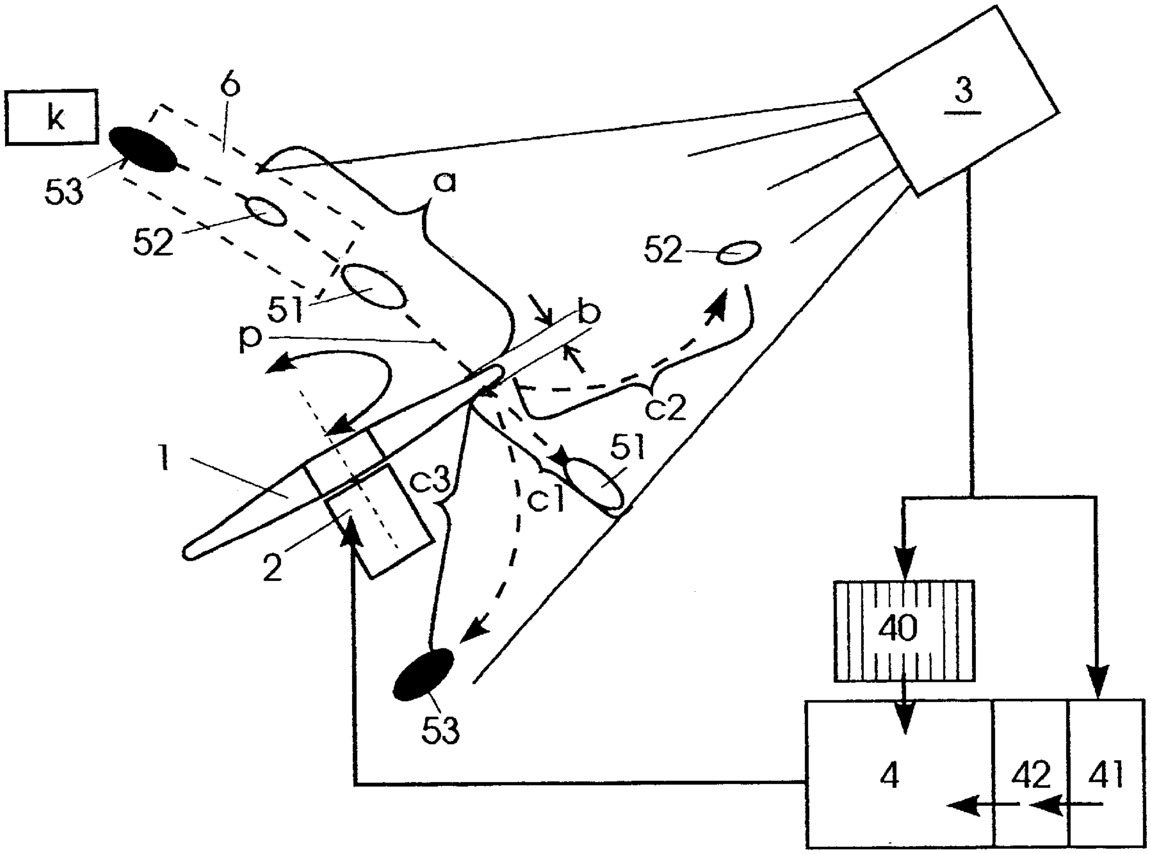
FIG. 1 an embodiment of a device of the present invention.

Referring to FIG. 1, a device is schematically shown of an embodiment of the present invention. In the example products have already been subjected to a successive line-up in an only indicated channel k, and have left the latter on a path p, here a parabolic trajectory, as a sequential partial flow or are carried on in such a flow. Thereby the products 51, 52, 53 pass a first zone, referred to as approaching zone a, then to a zone b in which a separating element 1 is provided, and proceed, in dependence on the selection they have to undergo, into partial fraction flows c1, c2, and c3. It is feasible to provide further partial fraction flows that depend on selection default. A real-time image detection system 3 captures both, the whole path of the products 51, 52, 53 through the zones a to cx and feature related product parameters such as size of pieces, approaching speed to the zone b, product profile, mass center and, if required, angular momentum of a product, for example. Such a real-time image detection system 3 advantageously comprises a high-speed camera which is generally known as smart-camera, including pre-processors integrated in the image converter which are already capable of computing, for example, a center of plane of a single product, apart from computing pure image data, and to provide these coordinates for a further processing control. Such cameras ensure an image resolution of at least 230 images/sec. (up to a theoretical 2000 images/sec.). The signals of the real-time image detection system 3 are correlated to the single products. Respective information of a single product such as volume, speed, profile of parts, center of mass, defective spots, deflection characteristic, angular momentum are each stored in addresses of a respective separate microprocessor 40 and from there are fed into a main coordinate memory 4. Outgoing signals from the main coordinate memory 4 are fed into a high-speed stepper motor 2. The latter controls the separating element 1, which in the frame of describing the drawings will be referred to in connection with explaining in more detail FIG. 2, 3*a*, and 3*b*. The feature-related parameters obtained for the single products by the real-time image detection system 3 up to arrival at the separating zone b are standing-by for the stepper motor 2 to control the separating element. As exemplified in FIG. 1 the stepper motor 2 controls the separating element 1 such that, for example, a ripe and sound fruit 51 takes the path c1 unaffected by the separating element 1, since the separating element remains in a GO- or rest position. In another example, too small a fruit 52 is directed along path c2 and a bad fruit 53 along the path c3 by action of the separating element 1. In order to describe the mode of operation of the separating element 1 in more detail, the most advantageous arrangement of the same within the scope of the invention will be explained.

FIG. 2 shows a plan view of a separating element 1. Fingers 10 are radially and equally distributed about the circumference of a central portion which is not designated specifically, in the example, the fingers 10 are arranged angularly displaced by 72°. Depending on the size of the products to be sorted, a greater number of fingers can be provided. However, within the teaching of the embodiment, at least three fingers 10 have to be present. In dependence on the products to be sorted, for example, sensitive fruits, the fingers are advantageously provided with a coating 11 on their outside which is a very soft elastomer. In particular, the fingers, as indicated in sectional view in the FIGS. 3*a* and 3*b*, are constructed as follows: the interior of a finger is provided with a cavity 14 which tapers towards a tip portion and which is enclosed by a core body 13. To provide the core body with an inherent rigidity it is made of rigid elastomer (for example 80 Shore) with fibers inserted, in particular carbon fibers. Further covers are mounted upon the core body 13 with increasing softness (for example, 70, 60, 50 Shore) towards the outside, only two covers 11, 12 of which are represented in FIGS. 3*a* and 3*b*. Such a construction of the separating element 1 results in a comparatively low mass and, hence, a low inertia so that it can be driven with a high angular speed and at considerably lower expenditures for energy compared to a compressed air selection mechanism. The resulting acoustic emission can be reduced below 70 dB. By example of FIG. 2 the separation into the mentioned partial fraction flows c1, c2, c3 will be described in more detail. When the fruit 51 which has been referred to above as being ripe and well arrives between the fingers 10*a* and 10*b*, the main coordinate processor 4 and a subsequent control means, respectively, do not feed a pulse into the stepper motor 2 so that the fruit 51 passes into the fraction flow c1, while the separating element remains in its original position. When the fruit 52, which has already been detected in the approaching zone a as being too small, arrives in the zone b between the fingers 10*a* and 10*b*, the stepper motor 2 receives an acceleration pulse in the direction of the fruit 52 (in FIG. 2 an anti-clockwise one) until the finger 10*a* just touches the surface of the fruit 52, at this moment it is decelerated for a short time, to apply a defined acceleration when the center of mass of the fruit 52 is level with the longitudinal central axis of the finger 10*a* so that the fruit 52 is ejected into The fraction flow c2. After the ejection has been carried out, the control of the separation element 1 delivers a further pulse for further rotating the separating element 1 in the same direction so that the finger 10*a* takes the former position of the finger 10*b*. Thus the entire position of the separating element 1 is congruent to the original position described. Provided that again and subsequent a fruit would arrive, which had to be passed into the partial fraction flow c2, then the separating element 1 has not to be brought back into the original position, since it is in an identical one. This involves the substantial advantage of doubling the sorting speed compared to single-pulse mode operated separating mechanisms. The selection of products 53 in the partial fraction flow c3 is performed in an analogous way with a reverse sense of rotation of the separating element 1, so that any further explanation is not necessary here. Furthermore, it is readily feasible within the scope of the invention, for example, for sorting foreign bodies from a sequential partial product flow, to apply a higher acceleration pulse to the separating element 1 for sorting such particles. Thus a sorting in more remotely located partial fraction flows can take place so that the invention is not restricted to only three partial fraction flows. It is essential within the frame of the invention that the real-time image tracking system also traces the path of the products after having been split up into single partial fraction flows cl, c2, c3 and feeds the signals (ejection range) obtained thereby into a storage 41. These derived signals are continuously compared to the presettable desired values which correspond to hits into the respective take-away channels or conveyer belts, which are allocated to the partial fraction flows and which, however, are not represented in more detail. By operation of a logic unit 42 output signals adapted to the desired values are generated in the memory and the stepper motor 2 with respect to acceleration is controlled according to these variations. This measure is of importance particularly in the starting phase of the sorting of a product batch and at the change-over between different products since, for example, products of equal mass but of different kind respond by different lengths of ejection at identical impacts. In particular, this measure involves the advantage that no changes of construction of the entire device have to be taken when there is a product change.

Furthermore, it lies within the frame of the invention to provide exchangeable sets of differently finger-equipped and/or of differently enveloped fingers for an optimum adaptation to respective goods to be sorted. It also lies within the frame of the invention that the real-time image tracking system 3 simultaneously detects sequential product flows which originate from several channels k.

Furthermore, it lies within the scope of the invention to provide a measuring chamber 6 which, arranged on both sides of the path p of the products 51, 52, 53, equipped with a plurality of optoelectronic image converters. The measuring chamber is known in principle and therefore it is not described here in detail and only is indicated by dash-lines in FIG. 1. The measuring chamber 6, preceding the first approaching zone a or partially including the first approaching zone, independently of the real-time image tracking system 3 measures products from all sides and also feeds the obtained signals into the main coordinate processor 4, wherein said signals are also associated, related to the single products, to the data of the real-time image tracking system 3. Such a combination is useful when there is desired an allover product detection. The task of such an allover product detection can be associated to the real-rime image tracking system 3 as an integral component thereof, whereby then at least two such real-time image tracking systems 3 have to be provided which, in juxtaposition, to detect products under different angles, comparable to an arrangement in DE 196 46 753.5. The information detected by them is fed into a common evaluation and control unit 4, 40, 41, 42.

Furthermore, the invention is not restricted to the described embodiments, neither in their entirety nor in detail. The separating element 3 in dependence on the products to be sorted and on the presettable criteria can also engage into the products, for example, from top whereby the same are lined-up and channeled in non-displaceable pathways. Still further, the embodiment of the fingers 10 can be, for example, of a flat design as well, departing from the above described circular shape, when there are products to be sorted, for example, which by such an embodiment of the fingers are not subject to any injuries or surface damages.

By virtue of the invention a device is provided which, when applied in the respective mode of operation with high speed and hit precision, ensures a product preserving sorting at low expenditures for energy, high wear resistance and comparatively low costs. The described solution permits a sorting of any desired piece or product sizes in dependence on the embodiment of the separating element, in particular on the number of fingers. In a special example, product sequences of at least fifty pieces/sec may be sorted with pieces having a size of 35 to 150 mm under use of five fingers at a 72° arrangement. Thus, throughput rates in a range of 6000 to 9000 kg/h are attainable for the goods potatoes, tomatoes or cucumbers.

All features disclosed in the specification, in the subsequent claims, and in the drawing are substantial for the invention both, individually and in any combination with one another.

What is claimed is:

1. A device for sorting products in dependence on a measured criteria comprising:

a channel;

a first zone receiving products from said channel;

a second zone receiving products from said first zone;

said second zone having a separating element including circumferentially and equally spaced apart fingers;

said fingers having a rigid core body;

said core body being enclosed by at least one elastomer cover;

a stepper motor for rotating said separating element;

a real time image tracking system for determining when a product enters the first zone and at least one parameter relating to volume, speed, profile of pieces, center of mass, defective spots, deflection characteristics and angular momentum; and at least one microprocessor and at least one address array for receiving said at least one parameter from said real time tracking system and for controlling said stepper motor to accelerate a finger of said fingers of said separating element in at least a first direction toward the product to be sorted and then to contact said product with a controlled acceleration to thereby impart to said product a related product acceleration based on the at least one parameter to direct a trajectory of the product into any one of at least two flow paths by motion in the first direction to effect sorting, wherein the finger is capable of effecting movement of the product into either one of the at least two flow paths by movement in a single direction which is the first direction.

2. The device according to claim 1, further comprising:

a measuring chamber arranged on both sides of a path of the products, said measuring chamber being equipped with a plurality of optoelectronic image converters and located in one of an area preceding the first zone and partially included in the first zone; and a main coordinate processor for receiving measurement signals from the measurement chamber wherein said measurement signals are related to data of the real-time image tracking system and used to further control said stepper motor.

3. The device according to claim 1, wherein said fingers include at least three fingers provided for the separating element and said fingers extend in radial distribution.

4. The device according to claim 3, wherein said fingers include five fingers, and adjacent fingers are mutually displaced by 72°.

5. The device according to claim 1, wherein said core body is embodied by a cone tapering from a center of the separating element to an end portion of the separating element, and said core body is made of rigid elastomer with fibers.

6. The device according to claim 5, wherein the fibers are carbon fibers.

7. The device according to claim 1, wherein said elastomer cover of the core body is constituted of a plurality of single covers superimposed one upon the other with increasing softness towards outer ones of the covers.

8. The device according to claim 1, wherein the real-time image tracking system is a high-speed camera having a resolution of at least 230 images/sec.

9. A method for sorting products in dependence on a measured criteria comprising:

providing a channel;

providing a first zone receiving products from said channel;

providing a second zone with a separating element with fingers receiving products from said first zone;

providing a stepper motor for rotating said separating element;

providing a real time image tracking system for determining when a product enters the first zone and at least one parameter relating to volume, speed, profile of pieces, center of mass, defective spots, deflection characteristics and angular momentum; and providing at least one microprocessor and at least one address array for receiving said at least one parameter from said real time tracking system and for controlling said stepper motor to accelerate a finger of said fingers of said separating element in at least a first direction toward the product to be sorted and then to contact said product with a controlled acceleration to thereby impart to said product a related product acceleration based on the at least one parameter to direct a trajectory of the product into any one of at least two flow paths by motion in the first direction to effect sorting, wherein the finger is capable of effecting movement of the product into either one of the at least two flow paths by movement in a single direction which is the first direction.

10. The method according to claim 9 further comprising the steps of:

measuring products in a measuring chamber arranged on both sides of a path of the products with a plurality of optoelectronic image converters and said path being located in one of an area preceding the first zone and an area partially included in the first zone; and providing a main coordinate processor for receiving measurement signals from the measurement chamber wherein said measurement signals are related to data of the real-time image tracking system and used to further control said stepper motor.

11. A method for sorting products in dependence on a measured parameter comprising:

measuring a parameter of one of a product and a piece for sorting; and controlling a stepper motor for rotating a separating element having a plurality of fingers depending on the measured parameter to accelerate a finger of said fingers of said separating element in at least a first direction toward the one of the product and piece to be sorted and then to contact said one of the product and piece with a controlled acceleration to thereby impart to said one of the product and the piece a related item acceleration based on the at least one parameter to direct a trajectory of the one of the piece and the product into any one of at least two flow paths by motion in the first direction to effect sorting, wherein the finger is capable of effecting movement of the one of the product and piece into either one of the at least two flow paths by movement in a single direction which is the first direction.

12. The method according to claim 11 further comprising:

the step of measuring including measuring the one of the product and piece in a measuring chamber arranged on both sides of a path of the one of the product and piece with a plurality of optoelectronic image converters to obtain the measured parameter; and providing a main coordinate processor for receiving measurement signals from the measurement chamber indicating the measured parameter and controlling the stepper motor accordingly.

* * * * *